United States Patent [19]
Sporrer et al.

[11] Patent Number: 6,152,247
[45] Date of Patent: *Nov. 28, 2000

[54] ZERO TURN TRANSAXLE

[75] Inventors: Ronald Sporrer; Raymond Hauser, both of Sullivan, Ill.

[73] Assignee: Hydro-Gear Limited Partnership, Sullivan, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/900,969

[22] Filed: Jul. 25, 1997

[51] Int. Cl.[7] ...................................................... B62D 11/00
[52] U.S. Cl. .......................................................... 180/6.28
[58] Field of Search ..................................... 180/370, 337, 180/343, 344, 346, 371, 376, 294, 298

[56] References Cited

U.S. PATENT DOCUMENTS

| | | | |
|---|---|---|---|
| 3,765,258 | 10/1973 | Jespersen | 74/243 R |
| 4,606,428 | 8/1986 | Giere . | |
| 4,761,206 | 8/1988 | Forrest | 204/9 |
| 4,845,949 | 7/1989 | Shivvers | 180/6.48 |
| 5,078,222 | 1/1992 | Hauser et al. . | |
| 5,201,692 | 4/1993 | Johnson et al. . | |
| 5,289,738 | 3/1994 | Szulczewski . | |
| 5,314,387 | 5/1994 | Hauser et al. . | |
| 5,842,535 | 12/1998 | Fox | 180/6.48 |

OTHER PUBLICATIONS

*Eaton Hydrostatic Transaxles,* Catalog 11–888, Aug. 1991, pp.2.
U.S. application No. 08/899,903, Sporrer.

*Primary Examiner*—Christopher P. Schwartz
*Assistant Examiner*—C. T. Bartz
*Attorney, Agent, or Firm*—John E. Hyatt; Gary R. Jarosik; Thomas C. McDonough

[57] ABSTRACT

A hydrostatic zero turn transaxle is provided with two identical transmission housings, wherein the housings and the output axle for the hydrostatic transmission can be easily adapted to be use for left-hand or right-hand drive, without the need for changing the casing or any of the internal gearing. A further feature of the invention is an improved parking brake feature comprising a brake shaft forming part of the output gear train and means for securing said brake shaft when the gear train is stopped to prevent movement of the gear train and the vehicle.

14 Claims, 7 Drawing Sheets

6,152,247

ZERO TURN TRANSAXLE

BACKGROUND OF THE INVENTION

This invention relates generally to zero turn transaxles and, more specifically, relates to an integrated zero turn hydrostatic transaxle. Zero turn transaxles are known in the art and provide for independent control of each of the drive wheels of the vehicle with which such transaxles are utilized. An example of one such transaxle may be found in U.S. Pat. No. 5,078,222 to Hauser et al. entitled "Zero Turn Transaxle" which issued on Jan. 7, 1992. Specifically, the '222 patent discloses a zero turn transmission having two identical mirror image reduction drives powered by independent self-contained hydraulic power units. Additionally, Eaton has developed and marketed zero turn transaxles as their Eaton Models 771 and 781. The Eaton Model 771 is an assembly with one pump and one motor where two mirror image Eaton Model 771 assemblies, a right and a left, are required for zero turn drive. The Eaton Model 781 consists of two units similar to the Eaton Model 771 joined together to make one assembly.

While the known zero turn transaxles work for their intended purpose, they do suffer from some deficiencies which it is the object of the subject invention to overcome. For example, implementing a zero turn drive is seen to be relatively costly owing to the requirement that two separate and distinct mirror image transaxles are needed which transaxles require individualized construction. Additionally, the currently utilized housings in which the transaxle components are carried are seen to undesirably add to the cost and time of manufacture in that they are constructed from at least two main housing sections joined along a seam or split line. Specifically, the use of at least two main housing sections requires relatively tighter tolerances in the manufacture of the housings in that each housing section must properly align to ensure that the components encased therein are properly supported and capable of operating without binding. Furthermore, the use of two non-similarly orientated transaxles to effectuate zero turn drive is seen to cause the tracking efficiency of the two drive wheels to vary with respect to one another since transaxles having non-identical construction and orientation will experience different operating conditions (e.g., different biasing, tolerances, design variances, etc.). In addition, currently utilized zero turn transaxles have been seen to have a relatively large footprint which undesirably increases the wheel base when used to implement zero turn drive and which also places a limit on the size of the vehicle with which the transaxles may be used.

From the foregoing, it is seen that a need exists for an improved zero turn transaxle. Accordingly, it is a general object of the present invention to provide a zero turn transaxle which may be manufactured at a relative cost savings. It is a more specific object of the present invention to provide an unhanded zero turn transaxle wherein the same transaxle may be utilized for both left handed and right handed drive. It is a further object of the present invention to provide a zero turn transaxle which, when used as a pair to implement zero turn drive, the left handed and right handed drive track similarly. Another object of the present invention is to provide a transaxle having a seamless main housing section. A further object of the present invention is to provide a zero turn drive having a relatively smaller wheel base and a transaxle having a relatively smaller footprint., and an improved parking brake mechanism.

SUMMARY OF THE INVENTION

In accordance with these objectives, the present invention resides in providing a zero turn transaxle where both of the transmission units are identical in construction, with the output drive shaft for the vehicle axle being adaptable to be modified for either left drive or right drive. An improved parking brake mechanism as part of the gear train of the transmission is also incorporated in the present invention. A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the invention, reference may be had to the preferred embodiments shown in the following drawings in which.

DETAILED DESCRIPTION OF THE DRAWINGS

Figure 1:
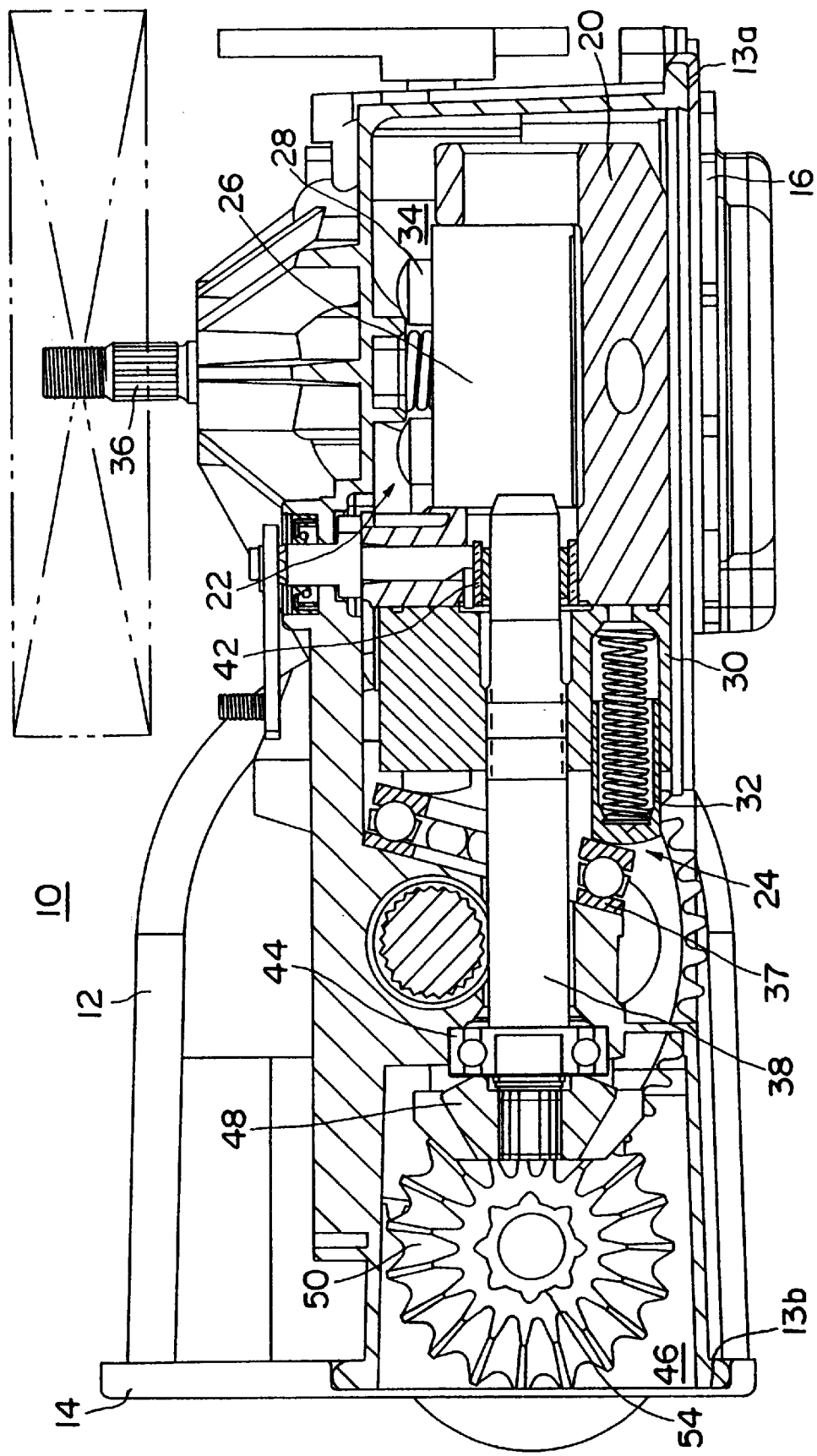
FIG. 1 illustrates a side, partial sectional view of an embodiment of an integrated hydrostatic transaxle ("IHT") constructed in accordance with the subject invention.

While the invention may be adapted for use in connection with other types of transmissions and transaxles, it will be described hereinafter in the context of an integrated hydrostatic transaxle ("IHT") as the preferred embodiment thereof.

Referring now to the figures, wherein like reference numerals refer to like elements, there is shown in the figures an IHT 10. While a brief description of the general construction and operation of the IHT will follow, the reader is referred to U.S. Pat. Nos. 5,201,692 and 5,314,387, which patents are hereby incorporated by reference in their entirety, for a more thorough discussion of this subject matter.

As illustrated, the IHT 10 includes a casing comprised of a seamless, main casing section 12, a first cap or cover 14, and a second cap or cover 16. More specifically, the main casing section 12 has a first opening and a second opening wherein the first cap 14 is disposed over the first opening and the second cap 16 is disposed over the second opening. While the embodiment of the invention illustrated shows the first cap 14 and second cap 16 being adapted for snap fit engagement with the main casing section 12, it will be understood that the first cap 14, second cap 16, and main casing section 12 may also be adapted to accept standard fasteners for use in placing the casing components into engagement. In either the fastener or fastenerless embodiments, the casing is provided with a substantially horizontal junction line 13a formed by the junction of the main casing section 12 with the second cap 16 and a substantially vertical junction line 13b formed by the junction of the main casing section 12 with the first cap 14.

The IHT 10 further includes a hydrostatic transmission disposed within the hydraulic chamber 34 of the main casing section 12 which may be described as being housed entirely within the main casing section 12 and covered by the second cap 16. The hydrostatic transmission comprises a center section 20 having hydraulic porting formed therein on which are mounted a hydraulic pump unit 22 and a hydraulic motor unit 24. The hydraulic pump unit 22 is hydraulically connected to the hydraulic motor unit 24 through the hydraulic porting formed in the center section 20 to form what is referred to as a hydraulic circuit. The hydraulic pump unit 22 further includes a pump cylinder block 26 having a plurality of piston receiving chambers formed therein in each of which is disposed a movable pump piston 28. Similarly, the hydraulic motor unit 24 includes a motor cylinder block 30 having a plurality of piston receiving chambers formed therein in each of which is disposed a movable motor piston 32.

An input shaft 36, which is driven by the engine of the vehicle (not shown), is drivingly connected to the hydraulic pump unit 22 such that the rotation of the input shaft 36 rotates the pump cylinder block 26 therewith. The rotation of the pump cylinder block 26 causes the pump pistons 28 to travel up and down as they travel against a movable swash plate. As will be understood by those skilled in the art, the swash plate may be moved to a variety of positions to vary the stroke of the pump pistons 28. In particular, as the stroke of the pump pistons 28 is varied, the volume of the hydraulic fluid pumped into the hydraulic porting will vary. Since the speed of the hydraulic motor unit 24 is dependent upon the amount of hydraulic fluid pumped thereinto by the hydraulic pump unit 22, the positioning of the swash plate is seen to control the speed of the hydraulic motor unit 24. More specifically, each of the motor pistons 32 is driven by the pumped hydraulic fluid against a fixed, angularly orientated motor thrust bearing 37 such that the action of the motor pistons 32 thereagainst forces the motor cylinder block 30 to rotate.

Figure 2:
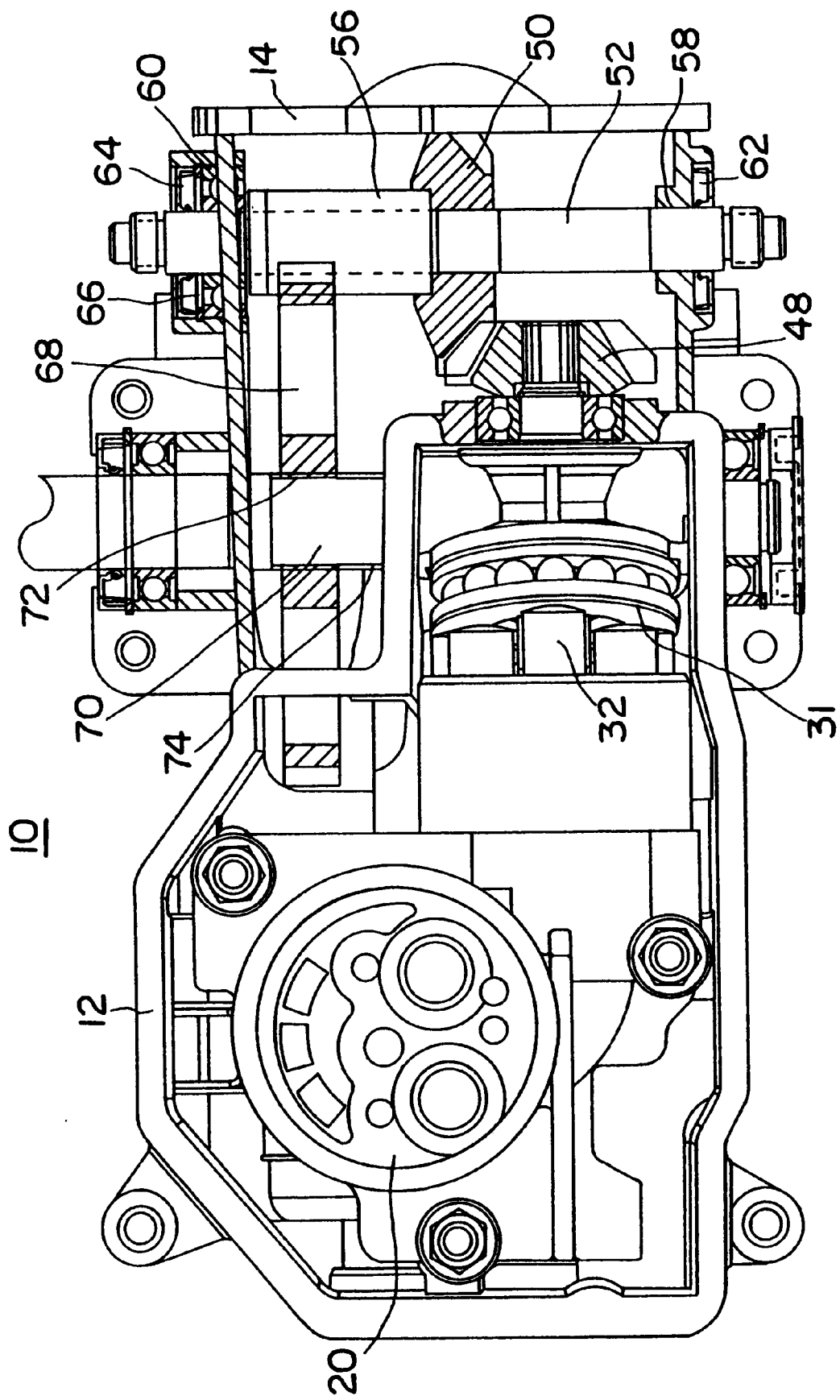
FIG. 2 illustrates a bottom, sectional view of an embodiment of an IHT constructed in accordance with the subject invention.

Drivingly connected to the motor cylinder block 30 is a motor shaft 38 which is arranged and adapted to rotate therewith. In particular, the motor shaft extends into the mechanical chamber 46 of the main casing section 12 which may be described as being housed entirely within the main casing section 12 and covered by the first cap 14. The motor shaft 38 is carried at its proximate end on a bearing 42 associated with the center section 20 and at its distal end on a bearing 44 associated with the main casing section 12. A first bevel drive gear 48 is drivingly connected to the distal end of the motor shaft 38. The first bevel drive gear 48 is, in turn, drivingly connected to a second bevel drive gear 50 which is drivingly mounted on a brake shaft 52. More specifically, as illustrated in FIGS. 1 and 2, the inner portion of one end of the second bevel drive gear 50 is provided with gear teeth 54 which are adapted to mate with gear teeth 56 formed on the brake shaft 52. As illustrated, additional hardware need not be used to retain the bevel gears 48, 50 on the respective shafts as the gear separating forces between the first bevel drive gear 48 and the second bevel drive gear 50 function to maintain the position of the bevel gears 48,50 thereon and their mating engagement. In the preferred embodiment of the subject invention, the second bevel drive gear 50 functions as a reduction gear.

Figure 6:
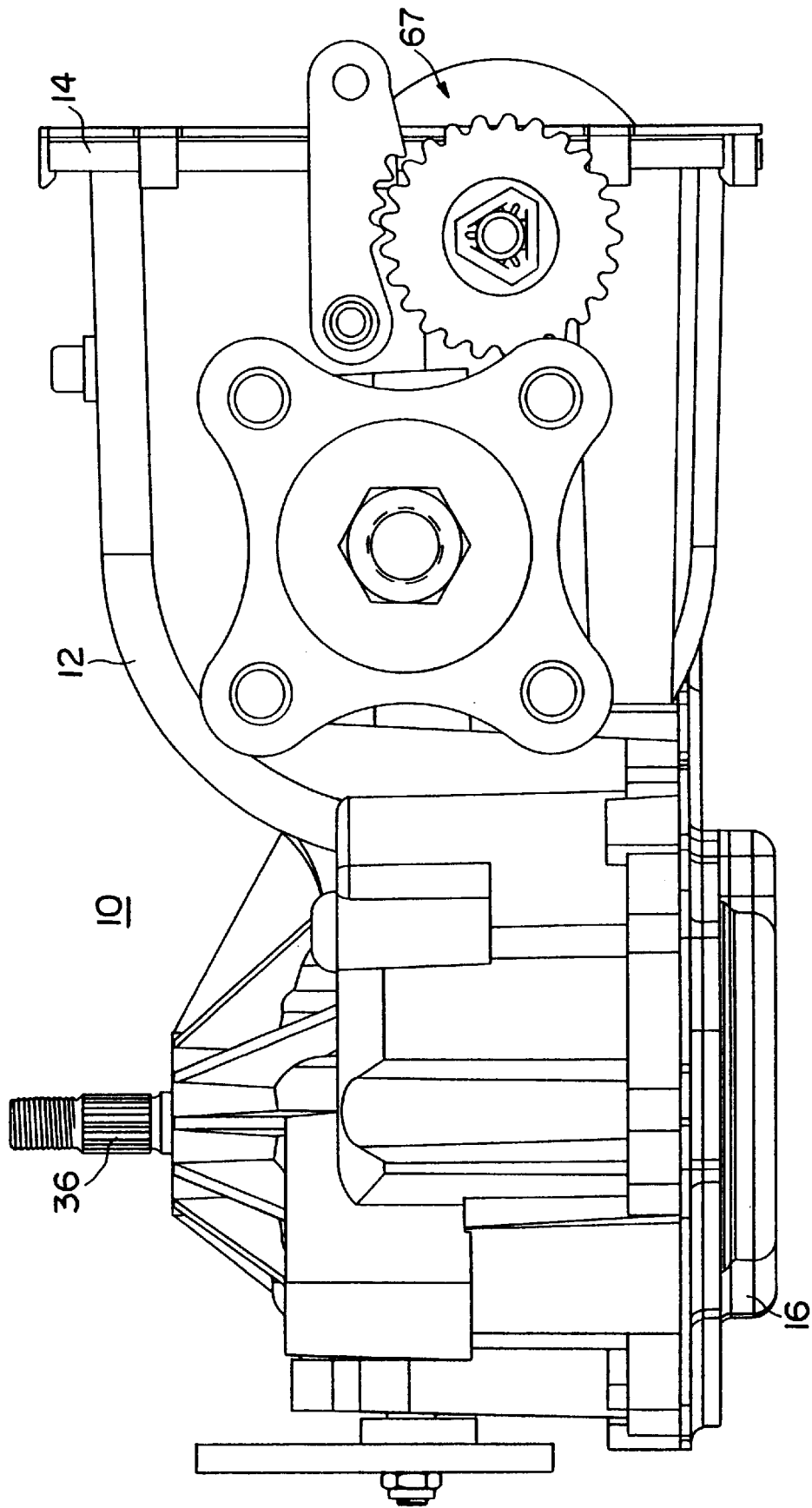
FIG. 6 illustrates a side view of the IHT illustrated in FIG. 1.

The brake shaft 52, on which the second bevel drive gear 50 is mounted, is preferably carried by the first casing section 12. In particular, the first casing section 12 is provided with a first pair of oppositely disposed apertures through which first and second ends of the brake shaft 52 preferably extend. The first aperture has a surface 58 which directly supports the first end of the brake shaft 52. Meanwhile, a bearing 60 is positioned within the second aperture for supporting the second end of the brake shaft 52. A second bearing is not required within the first aperture owing to the reduced loading experienced by the first end of the brake shaft 52. A first seal 62 is positioned within the first aperture about the first end of the brake shaft 52 while a second seal 64 is positioned in the second aperture, over a retaining ring 66, about the second end of the brake shaft 52. As shown in FIG. 6, a parking brake mechanism 67, positioned for engagement with one or both of the externally disposed first and second ends of the brake shaft 52, may be provided to prevent movement of the vehicle. Engagement of parking brake mechanism 67, which can only be performed when the vehicle is completely stopped, will prevent the rotation of the brake shaft 52 and the gear train engaged therewith, effectively preventing movement of the vehicle. In the preferred embodiment shown, there is no other braking mechanism other than the hydraulic braking inherent in an HST. This unique use of brake shaft 52 to prevent rotation of the gear train prevents the parking brake feature from being overridden by the transmission after it is engaged.

A bull gear 68 is further drivingly connected to the gear teeth 56 of the brake shaft 52 which is, in turn, drivingly connected to a reversibly positionable axle shaft 70. In particular, the bull gear 68 is floatingly positioned over the axle shaft 70 and is provided with gear teeth or splines 72 around its inner circumference which are adapted to drivingly mate with gear teeth or splines 74 formed on the axle shaft 70. Preferably, the distal portion 68a of the bull gear 68 is inwardly tapered to prevent the binding of the bull gear 68 against the neighboring walls of the main casing section 12 should the floating nature of the bull gear 68 place the bull gear 68 into engagement therewith. As will be described, the gear teeth 74 formed on the axle shaft 70 in cooperation with a second pair of oppositely disposed apertures formed in the main casing section 12 allow the axle shaft 70 to be reversibly positioned for either a left handed or right handed drive.

Figure 4:
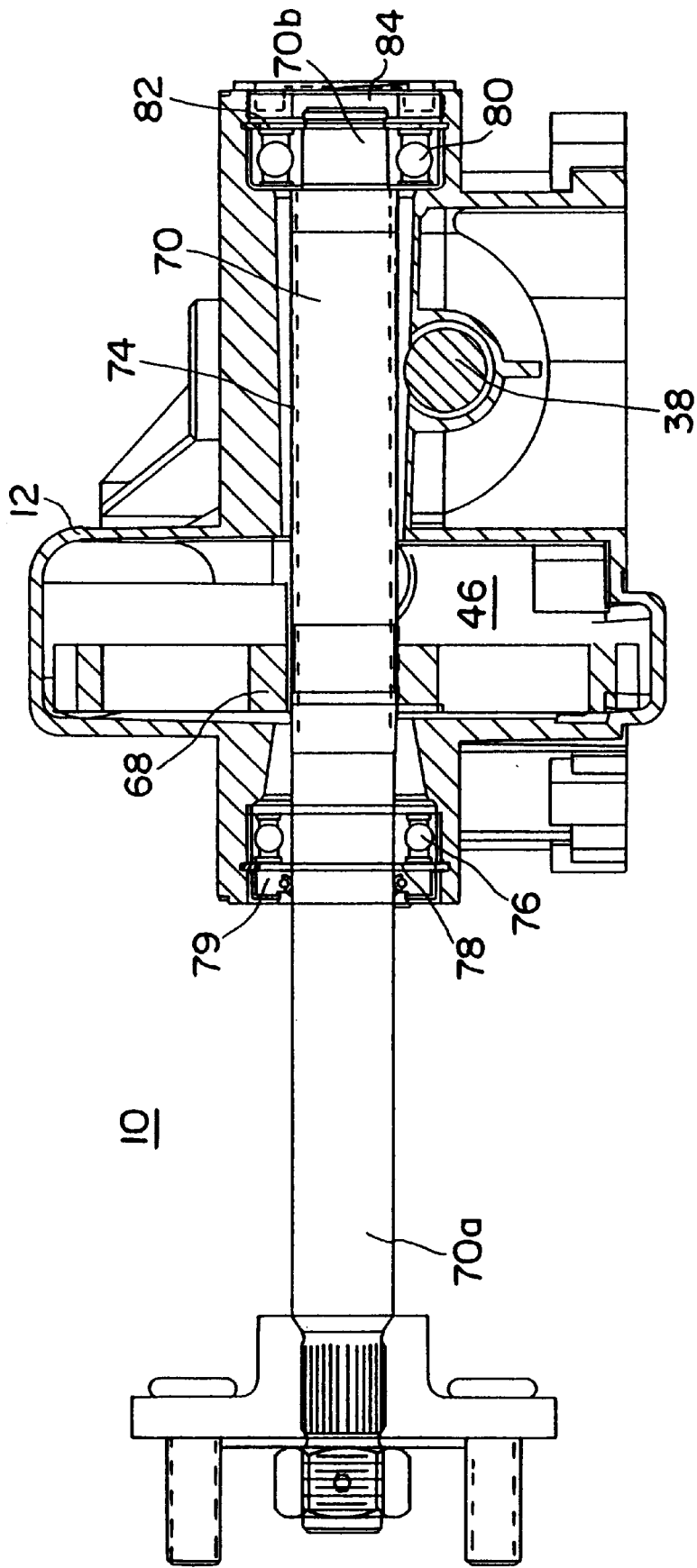
FIG. 4 illustrates a back, sectional view of an embodiment of an IHT constructed in accordance with the subject invention.
Figure 5:
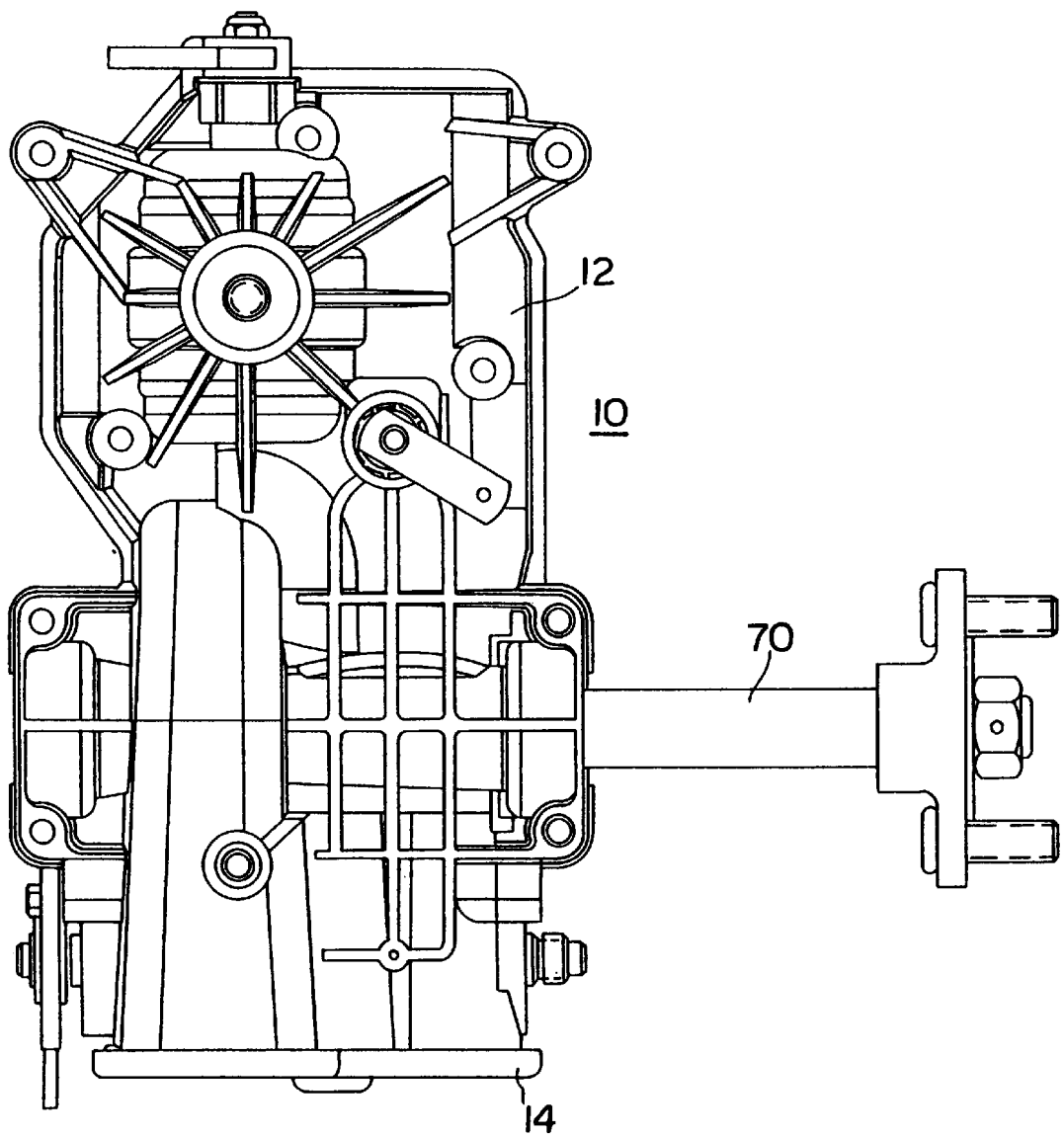
FIG. 5 illustrates a top view of the IHT illustrated in FIG. 2.

For left handed drive, best seen in FIG. 4, the distal end 70a of the axle shaft 70 extends from a third aperture formed in the main casing section 12 while the interior end 70b of the axle shaft 70 is positioned within a fourth aperture. More specifically, the third aperture has positioned therein a bearing 76 which supports the axle shaft 70, a retaining ring 78, and a seal 79 positioned around the axle shaft 70 through which the axle shaft 70 extends. Meanwhile, the fourth aperture similarly has positioned therein a bearing 80 which supports the interior end 70b of the axle shaft 70, a retaining ring 82, and a seal 84 which is adapted to cover the interior end 70b of the axle shaft 70.

Figure 3:
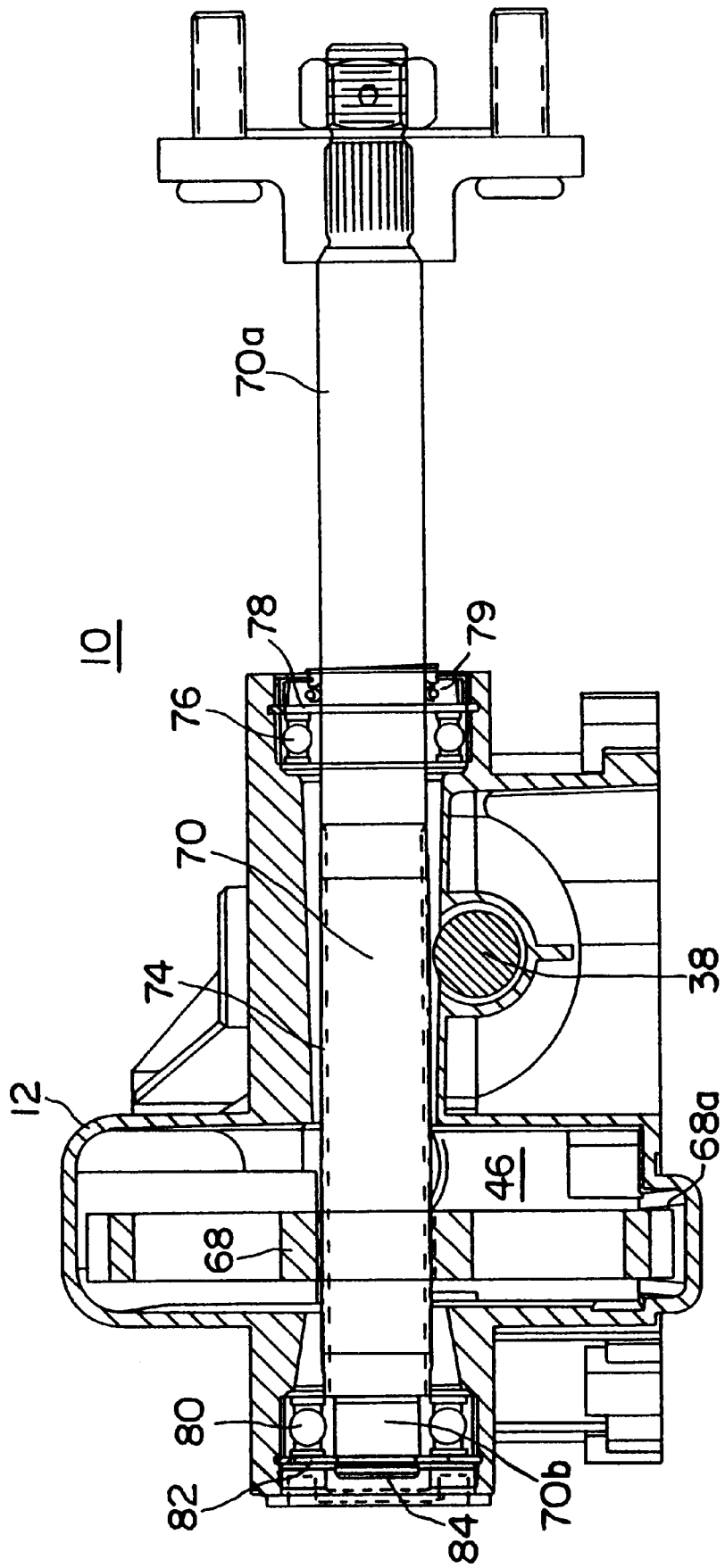
FIG. 3 illustrates a back, sectional view of an embodiment of an IHT constructed in accordance with the subject invention.

For right handed drive, best seen in FIG. 3, the distal end 70a of the axle shaft 70 extends from the fourth aperture formed in the main casing section 12 while the interior end 70b of the axle shaft 70 is positioned within the third aperture. More specifically, the fourth aperture has positioned therein the bearing 76 which supports the axle shaft 70, the retaining ring 78, and the seal 79 positioned around the axle shaft 70 and through which the axle shaft 70 extends. Meanwhile, the third aperture has positioned therein the bearing 80 which supports the interior end 70b of the axle shaft 70, the retaining ring 82, and the seal 84 which is adapted to cover the interior end 70b of the axle shaft 70.

As described above, the use of the reversibly positionable axle shaft 70 allows a single axle shaft to be used for either left handed or right handed drive. For this purpose, the gear teeth 74 of the axle shaft 70 are formed so as to extend along the substantial length of that portion of the axle shaft 70 which is positioned within the mechanical chamber 46 of the main casing section 12. In this manner, the teeth 74 of the axle shaft 70 are ensured of being able to matingly engage with the gear teeth 72 of the bull gear 68 when the axle shaft 70 is positioned in either drive configuration. While the gear teeth 74 are illustrated as extending continuously along this length, it will be understood that other arrangements of the gear teeth are contemplated so long as the axle shaft 70 is capable of being driven by the bull gear 68 when utilized in either drive configuration.

Figure 7:
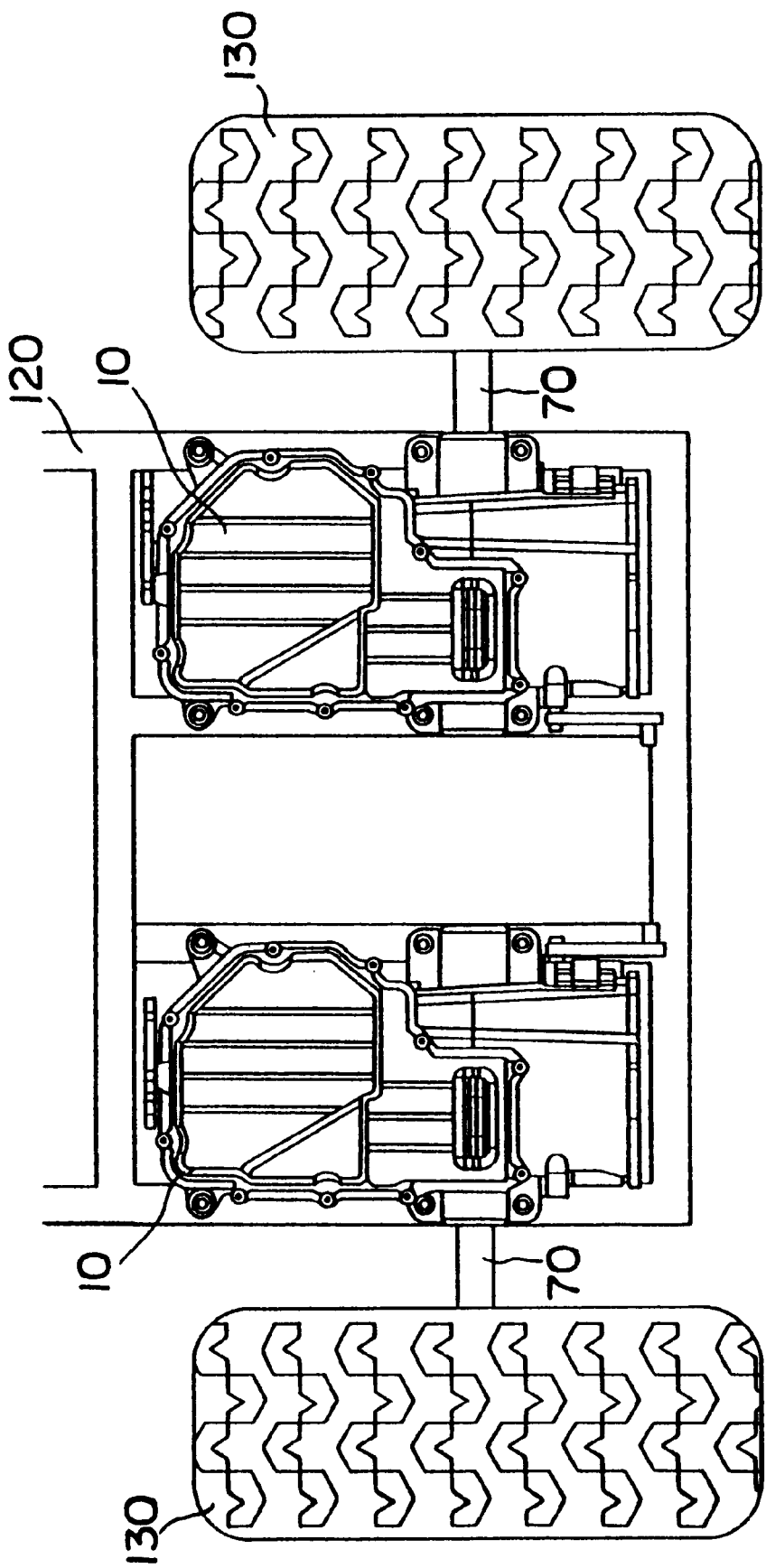
FIG. 7 illustrates a bottom, sectional view of a vehicle having an IHT constructed in accordance with the subject invention inserted thereon.

The use of such a transaxle 10 in a vehicle is depicted in FIG. 7, where it can be seen that identical housing units can be used for both transaxles 10, both of which are secured to vehicle frame and drive axles 70 to power wheels 130.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A vehicle having an engine, comprising:
    a left handed transaxle comprising a first casing, a first transmission disposed within said first casing drivingly connected to said engine, a first drive train disposed within said first casing drivingly connected to said first transmission, and a first axle shaft carried by said first casing and drivingly connected to said first drive train;
    a right handed transaxle comprising a second casing, a second transmission disposed within said second casing drivingly connected to said engine, a second drive train disposed within said second casing drivingly connected to said second transmission, and a second axle shaft carried by said second casing and drivingly connected to said second drive train;
    a first wheel mounted on said first axle shaft; and
    a second wheel mounted on said second axle shaft;
    wherein the orientation of said first transmission and said first drive train within said first casing is substantially identical to the orientation of said second transmission and said second drive train within said second casing.

2. The vehicle as recited in claim 1, wherein the orientation of said first axle shaft is substantially a mirror image of the orientation of said second axle shaft.

3. The vehicle as recited in claim 1, wherein said first transmission and said second transmission both comprise a hydrostatic transmission.

4. The vehicle as recited in claim 1, wherein said first casing is substantially identical in appearance to said second casing.

5. A vehicle having a chassis and an engine carried by said chassis, comprising:
    a left handed transaxle carried by said chassis comprising a first casing, a first transmission disposed within said first casing drivingly connected to said engine, a first drive train disposed within said first casing drivingly connected to said first transmission, and a first axle shaft carried by said first casing and drivingly connected to said first drive train;
    a right handed transaxle carried by said chassis proximate to said left handed transaxle comprising a second casing, a second transmission disposed within said second casing drivingly connected to said engine, a second drive train disposed within said second casing drivingly connected to said second transmission, and a second axle shaft carried by said second casing and drivingly connected to said second drive train;
    a first wheel mounted on said first axle shaft; and
    a second wheel mounted on said second axle shaft;
    wherein the orientation of said first casing is substantially identical to the orientation of said second casing.

6. The vehicle as recited in claim 5 wherein the orientation of said first transmission and said first drive train within said first casing is substantially identical to the orientation of said second transmission and said drive train within said second casing.

7. The vehicle as recited in claim 6, wherein the orientation of said first axle shaft is substantially a mirror image of the orientation of said second axle shaft.

8. The vehicle as recited in claim 5, wherein said first transmission and said second transmission both comprise a hydrostatic transmission.

9. A transaxle, comprising:
    a casing having first and second oppositely disposed openings;
    a transmission disposed within said casing;
    a single axle shaft extending from a select one of said first and second openings whereby said transaxle is configured for either right handed or left handed drive; and
    a drive train disposed within said housing, said drive train being drivingly linked to said transmission and adapted to drive said axle shaft in both the right handed and left handed drive configurations.

10. A transaxle, comprising:
    a seamless main casing section;
    a transmission carried substantially within said main casing section;
    a drive train carried substantially within said main casing section and drivingly linked to said transmission;
    a first cap attached to said main casing section disposed substantially over said transmission;
    a second cap attached to said main casing section disposed substantially over said drive train; and
    an axle shaft drivingly linked to said drive train and carried by said main casing section.

11. A transaxle as recited in claim 10, wherein said drive train is adapted to drive said axle shaft in both the right handed and left handed drive configurations.

12. A transaxle comprising
    a casing having a first opening and a second opening oppositely disposed to one another;
    a transmission disposed within said casing;
    a drive train disposed within said casing and drivingly linked to said transmission;
    an axle shaft drivingly engaged to said drive train, said axle shaft having a driving end extending from either said first opening or said second opening of said casing, an interior end mounted in said casing and a center axle portion;
    a first bearing means mounted in said first opening of said casing, said first bearing means and said first opening in said casing being formed to support and accept either said interior end or said center axle portion of said axle shaft;

a second bearing means mounted in said second opening of said casing, said second bearing and said second opening in said casing being formed to support and accept the other of said interior end or said center axle portion of said axle shafts.

13. A transaxle comprising, a casing and a hydrostatic transmission mounted in said casing;

a brake shaft rotatably mounted in said casing, and at least one end of said brake shaft extending outside of said casing;

a gear train mounted in said casing and drivingly engaged to said transmission, said gear train including at least one gear mounted on said brake shaft;

an output axle shaft mounted in said casing and drivingly engaged to said gear train means for securing said brake shaft to prevent rotation thereof, thereby preventing rotation of said gear train and said output axle.

14. A transaxle as recited in claim 13, further comprising said casing having a first opening and a second opening oppositely disposed to one another;

said output axle shaft having a driving end extending from either said first opening or said second opening of said casing, an interior end mounted in said casing and a center axle portion;

a first bearing means mounted in said first opening of said casing, said first bearing means and said first opening in said casing being formed to support and accept either said interior end or said center axle portion of said axle shaft;

a second bearing means mounted in said second opening of said casing, said second bearing and said second opening in said casing being formed to support and accept the other said interior end or said center axle portion of said axle shafts.

* * * * *

UNITED STATES PATENT AND TRADEMARK OFFICE
CERTIFICATE OF CORRECTION

PATENT NO. : 6,152,247
DATED : November 28, 2000
INVENTOR(S) : Ronald Sporrer and Raymond Hauser It is certified that error appears in the above-identified patent and that said Letters Patent is hereby corrected as shown below:

Column 6,
Lines 24 thru 51, delete claims 9, 10, and 11
Lines 52 thru 67, delete claim 12

Column 7,
Lines 1 thru 5, delete claim 12

Signed and Sealed this

Thirtieth Day of July, 2002

Attest:

JAMES E. ROGAN
Attesting Officer     Director of the United States Patent and Trademark Office